(12) United States Patent
Liu et al.

(10) Patent No.: US 8,073,489 B2
(45) Date of Patent: Dec. 6, 2011

(54) METHOD FOR DYNAMIC UPLINK SOUNDING REGION ALLOCATION

(75) Inventors: Qingwen Liu, San Jose, CA (US); Genyuan Wang, Plano, TX (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 1063 days.

(21) Appl. No.: 11/936,774

(22) Filed: Nov. 7, 2007

(65) Prior Publication Data

US 2008/0139248 A1 Jun. 12, 2008

Related U.S. Application Data

(60) Provisional application No. 60/874,071, filed on Dec. 11, 2006.

(51) Int. Cl.
*H04B 1/38* (2006.01)
(52) U.S. Cl. .............. 455/561; 455/450; 455/452.1; 455/452.2
(58) Field of Classification Search .......... 455/450, 455/561, 452.1, 452.2
See application file for complete search history.

(56) References Cited

U.S. PATENT DOCUMENTS

| | | | |
|---|---|---|---|
| 6,744,740 B2 | 6/2004 | Chen | |
| 2001/0031641 A1* | 10/2001 | Ung et al. | 455/456 |
| 2005/0159162 A1* | 7/2005 | Park | 455/450 |
| 2006/0035643 A1* | 2/2006 | Vook et al. | 455/450 |
| 2006/0120395 A1* | 6/2006 | Xing et al. | 370/431 |

OTHER PUBLICATIONS

IEEE Computer Society, "IEEE Standard for Local and Metropolitan Area Networks, Part 16: Air Interface for Fixed and Mobile Broadband Wireless Access Systems," IEEE Std. 802. 16e-2005 and IEEE Std. 802.16/2004/Cor1-2005, Feb. 28, 2006, [Retrieved Mar. 5, 2008] Retrieved from the Internet: <URL: http://www.ieeexplore.ieee.org/iel5/10676/33683/01603394.pdf> p. 50, para 4 and p. 647, para 5.
International Search Report and Written Opinion dated May 7, 2008 in Application No. PCT/US07/84030.

* cited by examiner

*Primary Examiner* — Charles Appiah
*Assistant Examiner* — William F Rideout

(57) ABSTRACT

The present invention discloses a method for allocating an uplink sounding region dynamically to obtain downlink channel quality information (CQI) about a downlink channel. The method comprises receiving a downlink transmission request and retrieving an identification information from the downlink transmission request, searching one or more databases using the retrieved identification information as a key, identifying the CQI about the downlink channel from the one or more databases, wherein the uplink sounding region needs not to be allocated when the CQI corresponding to the downlink transmission request is identified in the databases.

18 Claims, 3 Drawing Sheets

METHOD FOR DYNAMIC UPLINK SOUNDING REGION ALLOCATION

CROSS REFERENCE

The present application claims the benefit of U.S. Provisional Application Ser. 60/874,071, which was filed on Dec. 11, 2006.

BACKGROUND

In wireless and mobile communications systems, channel quality information (CQI) about an uplink channel is estimated based on training or pilot signals sent to a base transceiver station (BTS) by a mobile station (MS) or a customer premise equipment (CPE). CQI includes the carrier-to-interference-plus-noise ratio (CINR), beamforming weighting vectors for multiple antennas, Doppler frequency, Received Signal Strength Indication (RSSI), etc.

A downlink burst (from a BTS to a CPE) is a group of symbols carrying data and/or pilot signals. Because modulation, coding and transmission power assigned to a downlink burst are determined based on downlink CQI, it is essential that the downlink CQI should be available before a downlink burst is transmitted.

Because of the reciprocal nature of downlink and uplink channels in a wireless communications network employing time-division-duplex (TDD), downlink CQI (e.g. beamforming weighting vectors for a BTS equipped with multiple antennas) can be estimated using uplink training symbols.

FIG. 1 is a diagram illustrates the allocation of a sounding region for sending training symbols in a wireless communications network employing TDD. A TDD frame comprises a downlink sub-frame 102 and an uplink sub-frame 104. A sounding region 106, which is part of an uplink sub-frame 104, is allocated on demand. FIG. 1 shows three consecutive frames.

A region in an uplink sub-frame is identified as a dedicated sounding region where an MS sends uplink training symbols to a BTS. A dedicated sounding region can be allocated in one of the two ways. The first way is to allocate a sounding region periodically. More specifically, a sounding region is allocated every k frames to an MS or for a service flow, denoted as connection identification (CID). A frame is defined according to the design of a wireless communications network. The length of a frame should be small enough to guarantee that downlink CQI is available for each downlink burst transmission request. The second way is to allocate a sounding region on demand. When there is a request to send a downlink burst, a sounding region is allocated by the BTS.

Transmitting training symbols in a dedicated sounding region incurs overhead, which consumes valuable radio resources such as bandwidth, power, etc. Consequently, the utilization rate of the wireless communication network decreases.

As such, it is essential for a wireless communications network to obtain sufficient CQI information while minimizing the overhead of transmitting training symbols.

SUMMARY

The present invention discloses a method for allocating an uplink sounding region dynamically to obtain downlink channel quality information (CQI) about a downlink channel. The method comprises receiving a downlink transmission request and retrieving an identification information from the downlink transmission request, searching one or more databases using the retrieved identification information as a key, identifying the CQI about the downlink channel from the one or more databases, wherein the uplink sounding region needs not to be allocated when the CQI corresponding to the downlink transmission request is identified in the databases.

According to one aspect of the present invention, the key is selected from either a connection identification (CID) or a mobile station identification (MSID). According to another aspect of the present invention, the one or more databases include a scheduling database and a channel database.

The construction and method of operation of the invention, however, together with additional objects and advantages thereof, will be best understood from the following description of specific embodiments when read in connection with the accompanying drawings.

BRIEF DESCRIPTION OF THE DRAWING

The drawings accompanying and forming part of this specification are included to depict certain aspects of the invention. The invention may be better understood by reference to one or more of these drawings in combination with the description presented herein. It should be noted that the features illustrated in the drawings are not necessarily drawn to scale.

DESCRIPTION

The following detailed description of the invention refers to the accompanying drawings. The description includes exemplary embodiments, not excluding other embodiments, and changes may be made to the embodiments described without departing from the spirit and scope of the invention.

The present invention discloses a method for allocating dynamically a sounding region for a downlink burst to an associated mobile station (MS). The method minimizes the overhead of transmitting training symbols. It is applicable to a variety of wireless communications networks employing a variety of multiple access methods, including cellular networks, wireless local area networks (WLANs), wireless personal area network (WPANs), and sensor networks. The variety of multiple access method includes time-division-multiple-access (TDMA), frequency-division -multiple-access (FDMA), code-division-multiple-access (CDMA), wave-division-multiple-access (WDMA), and orthogonal-frequency-division-multiple-access (OFDMA).

The following description of the invention is illustrated with a wireless communications network employing TDD multiple access. In a wireless communications system, downlink CQI must be available before a downlink burst is transmitted. If a sounding region is allocated periodically regardless of whether there is a request to send a downlink burst, the CQI derived from sounding symbols may be of no use. In other words, some radio resources are wasted.

If a BTS identifies an uplink burst associated with a downlink burst in a near future while processing a downlink transmission request, it can estimate downlink CQI based on training symbols carried in the associated uplink burst without having to allocate a dedicated sounding region for an MS to transmit training symbols.

If the downlink CQI estimated previously is still available and channel conditions are not expected to change, the BTS can continue to use the existing CQI without the need to allocate a dedicated sounding region to the MS for transmitting training symbols. The method disclosed in the present invention takes advantage of the observations described above and thus reduces the consumption of radio resources.

Figure 1:
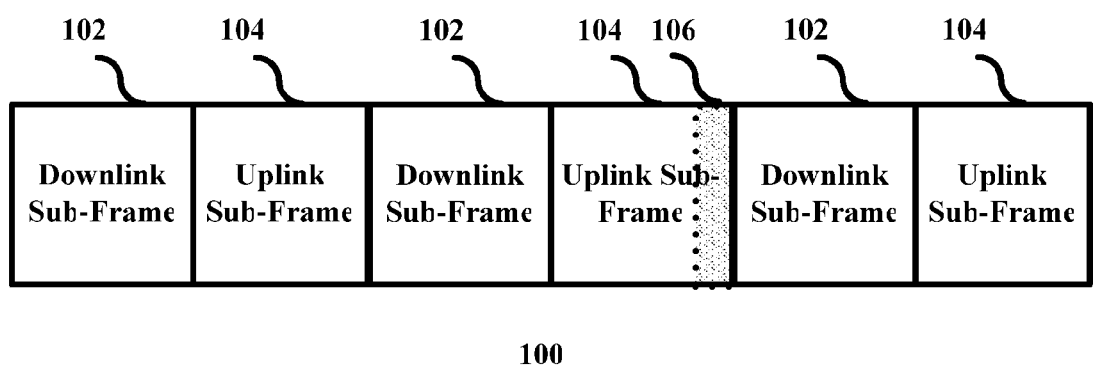
FIG. 1 is a diagram illustrating the allocation of a sounding region for sending training symbols in a wireless communications network employing TDD.
Figure 2:
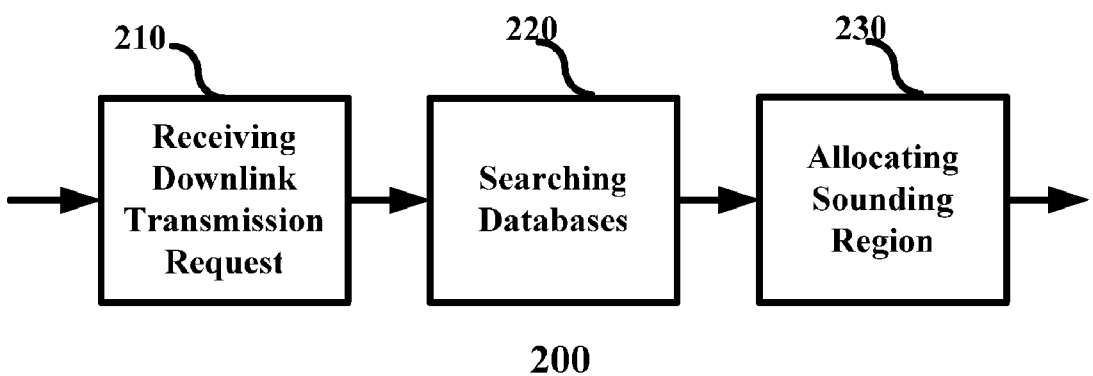
FIG. 2 is a flow diagram illustrating a dynamic allocation of a sounding region according to an embodiment of the present invention.

FIG. 2 is a flow diagram illustrating an embodiment of the present invention. Downlink and uplink bursts are identified by an associated service flow identification (ID)—either a connection ID (CID) or a mobile station ID (MSID).

Upon receiving a downlink transmission request the BTS retrieves an associated CID or MSID therein (step 210). Using the CID or MSID as a search key, the BTS searches a scheduling database containing information about uplink transmissions in the near future or a channel database containing downlink CQI information and mobility information about the MS (step 220).

Step 230 represents three different results from the search. If the search of the scheduling database yields a match, the BTS obtains downlink CQI by using the uplink burst and transmits downlink bursts in the succeeding frame, which is the frame that follows the one that carries the uplink bursts. If the search of the channel database yields a match, the BTS transmits a downlink burst in the succeeding frame using the CQI retrieved from the channel database. On the other hand, if neither the search of the scheduling database nor that of the channel database yields a match, the BTS allocates a sounding region in the succeeding frame to the MS for sending sounding signals. The BTS uses the sounding signals sent by the MS to obtain downlink CQI and transmits downlink burst in a frame succeeding the frame carrying the sounding signals.

One embodiment of the method disclosed in the present invention is that a sounding region is allocated when no information about downlink CQI is available or a change in downlink CQI is expected in the immediate past and the immediate future. As such, it provides higher efficiency than conventional methods.

Figure 3:
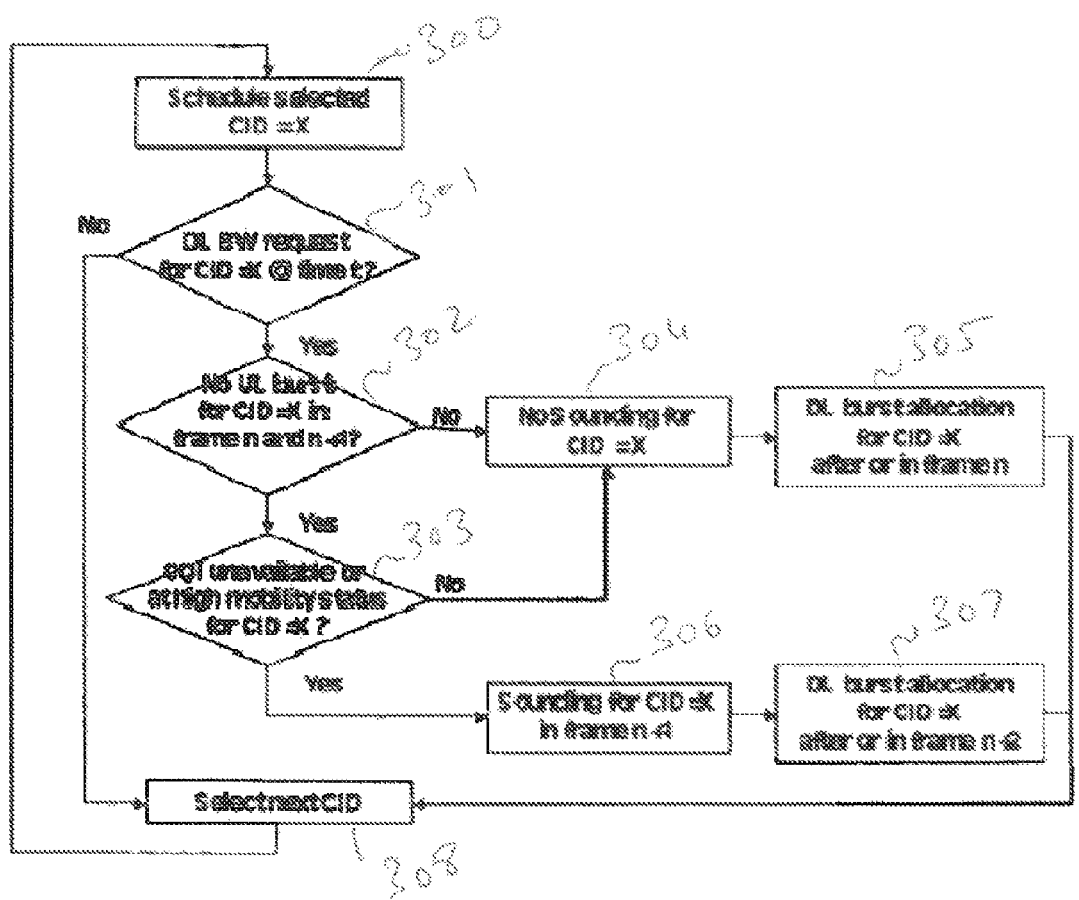
FIG. 3 is a flow diagram illustrating the logic flow of a sounding allocation according to an embodiment of the present invention.

FIG. 3 is a flow diagram illustrating the logic flow of the sounding allocation procedure. The procedure includes the following modules of judgment:

(1) At the beginning time of frame n at 300, say time t illustrated at 301, if a service flow with CID X has downlink (DL) information to transmit, i.e., CID X has DL bandwidth request, go to 302 to check whether there is uplink (UL) burst allocation for CID X.

(2) When checking UL allocation, if there is UL burst allocation for CID X in frame n and frame n+1, there is no sounding allocation for CID X and the DL burst for CID X is allocation after or in frame n. Otherwise, go to 303 to check whether CQI is available and whether CID X is at high mobility status.

(3) When checking CQI's availability and high mobility status, if CQI is unavailable or CID X is at high mobility status (which can be estimated based on CQI obtained in previous frames), then at 306 allocate sounding for CID X in the UL of the frame n+1. Therefore, at 307 BTS can obtain DL CQI for CID X at the beginning of frame n+2 relying on this sounding and allocate DL burst for CID X in frame n+2. Otherwise, at 304 there is no sounding allocation for CID X and at 305 the DL burst for CID X is allocation after or in frame n.

The procedure at 308, loops back to the beginning time of frame at 300 when it is processing the next CID.

The reason that sounding can be allocated in frame n+1 rather than frame n is that there is a constraint that the sounding allocation control message should be sent in DL from BTS one frame ahead of sounding allocation frame. If there is no such constraint, control message and sounding allocation can be shift one frame ahead.

Since the new sounding allocation procedure depends on extra conditions, the probability of actually allocated sounding is less than those of existing methods. Therefore, the new procedure can achieve better spectral efficiency.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method for allocating an uplink sounding region dynamically to obtain downlink channel quality information (CQI) about a downlink channel, the method comprising:
    receiving a downlink transmission request for a downlink transmission to an associated mobile station (MS);
    retrieving identification information from the downlink transmission request;
    searching one or more databases using the retrieved identification information as a key;
    identifying the downlink CQI about the downlink channel from the one or more databases;
    allocating the uplink sounding region only when the CQI corresponding to the downlink transmission request is unavailable in the databases or a mobility status of the associated MS is high; and
    when the uplink sounding region is allocated, allocating the downlink transmission request in a frame after a frame in which the sounding region is allocated.

2. The method of claim 1, wherein the downlink transmission request is associated with an identification index selected from the group consisting of a connection identification (CID) and a mobile station identification (MSID).

3. The method of claim 1, wherein the one or more databases include a scheduling database and a channel database.

4. The method of claim 3, wherein searching further comprises: searching the scheduling database for scheduling information about an uplink transmission request in succeeding frames; and searching the channel database for downlink CQI and information about stability of the downlink CQI that is used for transmitting the downlink transmission.

5. The method of claim 4, wherein searching scheduling database comprises using a key selected from the group consisting of a connection identification (CID) and a mobile station identification (MSID).

6. The method of claim 4, wherein the channel database contains the CQI information about a plurality of downlink channels and mobility information indicating mobility status about a plurality of mobile stations.

7. The method of claim 4, wherein searching the channel database comprises using a key selected from the group consisting of a connection identification (CID) and a mobile station identification (MSID).

8. The method of claim 4, and further comprising determining the stability of the CQI based on the mobility of the mobile station.

9. The method of claim 1, wherein identifying the downlink CQI further comprises: obtaining the downlink CQI from the uplink transmission and from the channel database.

10. A method for allocating an uplink sounding region dynamically to obtain downlink channel quality information (CQI) about a downlink channel, the method comprising:
   receiving a downlink transmission request for a downlink transmission to an associated mobile station (MS), wherein the downlink transmission request is associated with an identification index selected from the group consisting of a connection identification (CID) and a mobile station identification (MSID);
   retrieving identification information from the downlink transmission request;
   searching one or more databases using the retrieved identification information as a key, wherein one or more databases include a scheduling database and a channel database, wherein the key is selected from the group consisting of a CID and a MSID;
   identifying the CQI about the downlink channel from the one or more databases;
   allocating the uplink sounding region only when the CQI corresponding to the downlink transmission request is unavailable in the databases or a mobility status of the associated MS is high; and
   when the uplink sounding region is allocated, allocating the downlink transmission request is allocated in a frame after a frame in which the sounding region is allocated.

11. The method of claim 10, wherein the channel database contains the CQI information about a plurality of downlink channels and mobility information about a plurality of mobile stations.

12. The method of claim 10, wherein searching further comprises: searching the scheduling database for scheduling information about an uplink transmission request in succeeding frames; and searching the channel database for downlink CQI and information about stability of the downlink CQI that is used for transmitting the downlink transmission.

13. The method of claim 12, and further comprising determining the stability of the CQI based on the mobility of the mobile station.

14. The method of claim 10, wherein identifying the downlink CQI further comprises: obtaining the downlink CQI from the uplink transmission and from the channel database.

15. The method of claim 1, wherein when the uplink sounding region is allocated, allocating the downlink transmission request in the current frame or after the current frame.

16. The method of claim 1, and further comprising estimating the mobility status of the MS based on CQI obtained in previous frames.

17. The method of claim 10, wherein when the uplink sounding region is allocated, allocating the downlink transmission request in the current frame or after the current frame.

18. The method of claim 10, and further comprising estimating the mobility status of the MS based on CQI obtained in previous frames.

* * * * *

UNITED STATES PATENT AND TRADEMARK OFFICE
CERTIFICATE OF CORRECTION

| | | |
|---|---|---|
| PATENT NO. | : 8,073,489 B2 | Page 1 of 1 |
| APPLICATION NO. | : 11/936774 | |
| DATED | : December 6, 2011 | |
| INVENTOR(S) | : Liu et al. | |

It is certified that error appears in the above-identified patent and that said Letters Patent is hereby corrected as shown below:

On the cover page of the patent item (75) Inventors, in Qingwen Liu's residence, replace "San Jose, CA" with -- Richardson, TX --.

Signed and Sealed this
Thirty-first Day of January, 2012

David J. Kappos
*Director of the United States Patent and Trademark Office*